United States Patent
Zhao et al.

(10) Patent No.: US 10,313,486 B2
(45) Date of Patent: Jun. 4, 2019

(54) OPTIMIZING TRANSFER OF FRAGMENTED PACKETIZED DATA

(71) Applicant: SONICWALL US HOLDINGS INC., Milpitas, CA (US)

(72) Inventors: Li Zhao, Shanghai (CN); Dong Xiang, Shanghai (CN); Zhong Chen, Shanghai (CN); Yicheng He, Shangai (CN); Yanjun Yang, Shanghai (CN)

(73) Assignee: SONICWALL INC., Milpitas, CA (US)

(*) Notice: Subject to any disclaimer, the term of this patent is extended or adjusted under 35 U.S.C. 154(b) by 0 days.

(21) Appl. No.: 14/591,781

(22) Filed: Jan. 7, 2015

(65) Prior Publication Data

US 2016/0198020 A1  Jul. 7, 2016

(51) Int. Cl.
*H04L 29/06* (2006.01)

(52) U.S. Cl.
CPC ............ *H04L 69/04* (2013.01); *H04L 69/166* (2013.01)

(58) Field of Classification Search
None
See application file for complete search history.

(56) References Cited

U.S. PATENT DOCUMENTS

| | | | |
|---|---|---|---|
| 5,991,713 A | 11/1999 | Unger et al. | |
| 6,282,542 B1 | 8/2001 | Carneal et al. | |
| 6,826,152 B1 * | 11/2004 | Kroon | H04L 12/5693 370/230.1 |
| 7,120,666 B2 | 10/2006 | McCanne et al. | |
| 7,254,636 B1 | 8/2007 | O'Toole, Jr. et al. | |
| 7,564,861 B1 * | 7/2009 | Subbiah | H03M 7/30 370/428 |
| 7,716,307 B1 | 5/2010 | Ben-Shaul et al. | |
| 7,809,693 B2 | 10/2010 | Lango et al. | |
| 8,090,866 B1 | 1/2012 | Bashyam et al. | |
| 8,112,505 B1 | 2/2012 | Ben-Shaul et al. | |
| 8,176,186 B2 | 5/2012 | McCanne et al. | |
| 8,244,864 B1 | 8/2012 | Bahl et al. | |
| 9,813,526 B2 | 11/2017 | Liddicott | |
| 9,917,882 B2 | 3/2018 | Liddicott et al. | |
| 2003/0039248 A1 * | 2/2003 | Weaver | H04L 12/6418 370/392 |
| 2003/0065796 A1 | 4/2003 | Borr | |
| 2003/0084183 A1 | 5/2003 | Odlund et al. | |
| 2003/0204593 A1 | 10/2003 | Brown et al. | |

(Continued)

OTHER PUBLICATIONS

U.S. Appl. No. 14/821,635 Office Action dated Apr. 24, 2017.

(Continued)

*Primary Examiner* — Viet D Vu
*Assistant Examiner* — Mohammad Yousuf A. Mian
(74) *Attorney, Agent, or Firm* — Polsinelli LLP

(57) ABSTRACT

The present invention increases the efficiency of transmitting data from a plurality of fragmented internet protocol (IP) packets over a computer network. After receiving a plurality of fragmented packets over a computer network interface a computing device may reassemble data from the plurality of packets into an IP packet that includes data from each of the fragmented IP packets. The reassembled IP packet may then be compressed and encrypted before being transmitted to a computer identified in a destination address in each of the plurality of fragmented packets.

20 Claims, 3 Drawing Sheets

(56) References Cited

U.S. PATENT DOCUMENTS

| | | |
|---|---|---|
| 2004/0088375 A1 | 5/2004 | Sethi et al. |
| 2004/0255048 A1 | 12/2004 | Lev Ran et al. |
| 2005/0015461 A1 | 1/2005 | Richard |
| 2005/0086306 A1 | 4/2005 | Lemke |
| 2005/0114436 A1 | 5/2005 | Betarbet |
| 2005/0262220 A1 | 11/2005 | Ecklund |
| 2007/0124477 A1 | 5/2007 | Martin |
| 2007/0250552 A1 | 10/2007 | Lango et al. |
| 2008/0229025 A1 | 9/2008 | Plamondon |
| 2009/0077252 A1* | 3/2009 | Abdo .................. H03M 7/3084 709/231 |
| 2009/0222515 A1 | 9/2009 | Thompson et al. |
| 2009/0276543 A1 | 11/2009 | Turner et al. |
| 2009/0300162 A1 | 12/2009 | Demarie et al. |
| 2010/0098092 A1 | 4/2010 | Luo et al. |
| 2010/0177642 A1 | 7/2010 | Sebastian et al. |
| 2011/0051173 A1* | 3/2011 | Yagishita .............. G06F 3/1222 358/1.14 |
| 2012/0226738 A1 | 9/2012 | Taneja et al. |
| 2012/0257120 A1 | 10/2012 | Nakai |
| 2012/0257500 A1* | 10/2012 | Lynch .................... H04L 47/52 370/235 |
| 2012/0265892 A1 | 10/2012 | Ma |
| 2013/0091303 A1* | 4/2013 | Mitra ................. H04L 61/2557 709/238 |
| 2013/0097309 A1 | 4/2013 | Ma et al. |
| 2013/0198868 A1 | 8/2013 | Georgiev |
| 2013/0297679 A1 | 11/2013 | Kim |
| 2014/0026182 A1 | 1/2014 | Pearl |
| 2014/0040353 A1 | 2/2014 | Sebastian |
| 2015/0089019 A1 | 3/2015 | Chou |
| 2015/0142874 A1 | 5/2015 | He et al. |
| 2016/0085920 A1 | 3/2016 | Cyran |
| 2016/0156696 A1 | 6/2016 | Liddicott |
| 2016/0218902 A1* | 7/2016 | Hwang .............. H04L 27/2602 |
| 2016/0335324 A1 | 11/2016 | Caulfield |
| 2016/0352869 A1 | 12/2016 | Liddicott |
| 2017/0041431 A1 | 2/2017 | Liddicott |
| 2017/0366651 A1 | 12/2017 | Liddicott |

OTHER PUBLICATIONS

U.S. Appl. No. 14/556,157 Office Action dated Nov. 15, 2016.
U.S. Appl. No. 14/556,157 Office Action dated Jun. 5, 2017.
U.S. Appl. No. 15/690,642, filed Aug. 30, 2017, Samuel Liddicott, Reducing Transmission Pathway Lengths Withing a Distributed Network.
U.S. Appl. No. 14/821,635 Final Office Action dated Sep. 22, 2017.
U.S. Appl. No. 14/821,635 Office Action dated Feb. 6, 2018.

* cited by examiner

OPTIMIZING TRANSFER OF FRAGMENTED PACKETIZED DATA

BACKGROUND OF THE INVENTION

Field of the Invention

The present invention is generally related to optimizing the transfer of packetized data between electronic devices in a computer network. More specifically, the present invention relates to assembling, and compressing a plurality of fragmented packets in a manner that minimizes the size of payload data when transferring digital information over a computer network. Description of the Related Art Internet protocol (IP) payload compression (IPComp) is a technique that compresses and encrypts IP packets as the IP packets are being transmitted through a computer network. Conventionally a set of data or a stream of data is fragmented into a series of packets that are commonly referred to as fragmented IP packets. Generally an electronic device such as a gateway compresses, encrypts, and re-transmits fragmented packets of information as they are received. After being received at a destination the packets are de-encrypted, de-compressed, and re-assembled into the complete data set or data stream.

A series of fragmented packets may include any sort of computer data that is transmitted from a source computer to a destination computer communicating over a computer network. The packets may contain information relating to a file, a message, commands, a video or audio stream, or may include encapsulated data.

Data transferred over a computer network may be a datagram, which may be a self-contained data structure including sufficient information to be routed from a source computer to a destination computer without requiring exchanges of information that setup or configure a communication path between the source computer and the destination computer or a computer network over which the datagram is transmitted. Datagrams may be transmitted over standard computer networks. Datagrams commonly include fields of information that may include a preamble, a header length, a header checksum, a destination address, a source address, payload data, a data type, a length field, and a frame sequence number. In certain instances all of the information included in a datagram is compressed and then encapsulated into a set of data before an IP packet including the datagram is transmitted. In certain instances a datagram may be an IP packet or be encapsulated within an IP packet.

Frequently, at least some of the information included in the datagram is information that is not used by an application program at the destination computer. For example, an application program playing streaming audio may only require the payload data in the datagram. When transmitted over a computer network these additional pieces of information consume a portion of the overall network bandwidth. The more packets used to transfer a particular data set increase the overhead associated with transferring data over a computer network. For example, a data set transferred over a computer network using 10 packets could include twice as much additional pieces of information (i.e., overhead) than the same set of data transferred over the computer network using 5 packets.

Another factor that increases the overhead associated with transferring data over a computer network is the compression efficiency. Generally data from a data set when compressed will include fewer bytes of data as compared to fragmenting the data set into a plurality of pieces and then compressing each of the plurality of pieces of fragmented data independently.

Electronic devices transferring packets over a computer network commonly compress, encrypt, and then re-transmit packets as they are received. This practice increases the overhead associated with transferring data over the computer network because the total number of bytes transferred over the computer network is not optimized. Legacy computer networks commonly use standardized IPComp techniques when re-transmitting a plurality of fragmented packets over a computer network. Even though IPComp protocols reduce the size of IP datagrams transmitted over the internet, IPComp protocols do not maximize the efficiency of transmitting these fragmented packets. One reason for this is that the packets transmitted may not be of an optimal size when they are compressed.

An example of an IPComp protocol is the RFC3173 standardized compression protocol. Frequently IPComp is used with an IP security (IPSec) Virtual Private Network (VPN) when transmitting packets over a computer network. When IPComp is combined with a secure IPSec VPN, fragmented packets received are compressed according to an IPComp standard, each compressed packet is then individually encrypted by a IPSec VPN engine, and then each compressed/encrypted packet is transmitted over the computer network to a destination address.

What is needed is an increase in the efficiency of transmitting data over a computer network as to reduce the number of bytes of data transferred over the computer network.

SUMMARY OF THE PRESENTLY CLAIMED INVENTION

The present invention increases the efficiency of transmitting data from a plurality of fragmented internet protocol (IP) packets over a computer network. A computing device such as a gateway or a firewall in a computer network that receives fragmented IP packets over a computer network interface may assemble or reassemble data from a plurality of fragmented IP packets into a single IP packet. Data from the plurality of fragmented IP packets may be concatenated or coalesced within the single IP packet. The single IP packet may then be compressed using a compression algorithm and the compressed IP packet may then be transmitted over a computer network interface to a destination computer. The compressed IP packet may also be encrypted before being transmitted over the computer network interface.

The present invention may repeat the process of reassembling numerous sets of fragmented IP packets where each set of fragmented IP packets may include a plurality of different IP packets. Each set of fragmented IP packets may be coalesced into an individual IP packet and each individual IP packet may be compressed and encrypted before being transmitted over the computer network interface to a destination.

DETAILED DESCRIPTION

The present invention increases the efficiency of transmitting data from a plurality of fragmented internet protocol (IP) packets over a computer network. After receiving a plurality of fragmented packets over a computer network interface a computing device may reassemble data from the plurality of packets into a reassembled (concatenated/coalesced) IP packet that includes data from each of the plurality fragmented IP packets. The reassembled IP packet may then be compressed before being transmitted to a computer identified in a destination address in each of the plurality of fragmented packets. In certain instances the compressed IP packet may also be encrypted before transmitting the encrypted compressed IP packet to a destination address.

In certain instances the data from the plurality of fragmented IP packets received may be concatenated in the order received, in other instances the plurality of fragmented IP packets may be re-ordered when out of order before the data is concatenated. The plurality of fragmented IP packets may be received over a computer network interface from a computing device connected to the internet or an intranet.

The single IP packet may then be compressed using a compression algorithm. The compression algorithm may be implemented in hardware, in software, or combination thereof. In certain instances the present invention may be implemented as a software program executing instructions out of memory, in an application specific integrated circuit (ASIC), using a field programmable gate array (FPGA), or be implemented using a combination of hardware and software.

Figure 1:
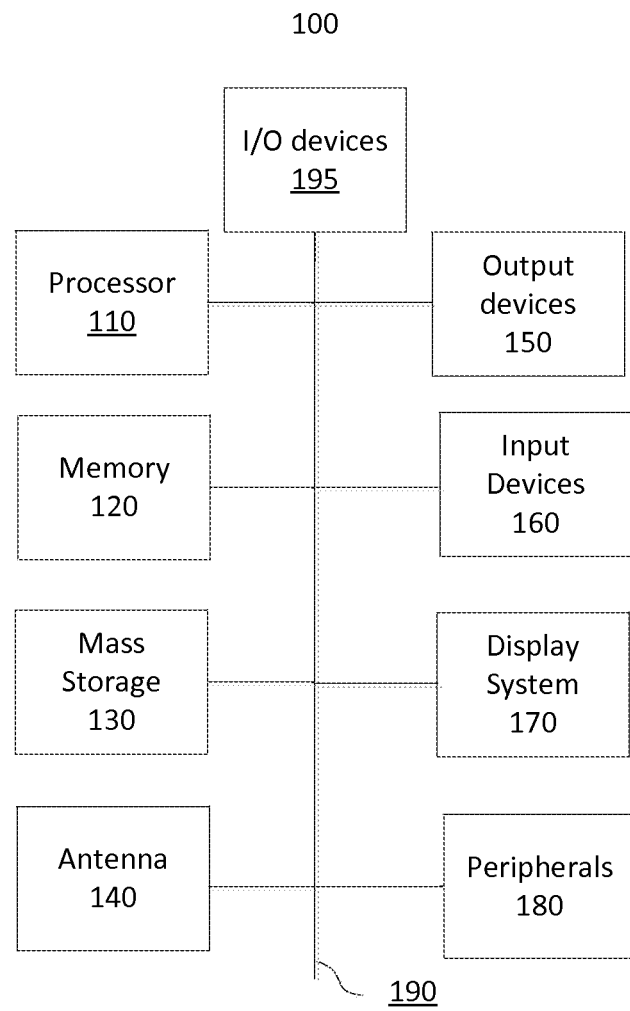
FIG. 1 is a block diagram of a device for implementing the present technology.

FIG. 1 is a block diagram of a device for implementing the present technology. FIG. 1 illustrates an exemplary computing system 100 that may be used to implement a computing device with the present technology. Note that FIG. 1 is exemplary and that all features shown in the figure may not be included in a gateway or a firewall implementing the present invention. System 100 of FIG. 1 may be implemented in the contexts of the likes of clients and servers. The computing system 100 of FIG. 1 includes one or more processors 110 and memory 120. Main memory 120 may store, in part, instructions and data for execution by processor 110. Main memory 120 can store the executable code when in operation. The system 100 of FIG. 1 further includes mass storage 130, which may include resident mass storage and portable storage, antenna 140, output devices 150, user input devices 160, a display system 170, peripheral devices 180, and I/O devices 195.

The components shown in FIG. 1 are depicted as being connected via a single bus 190. However, the components may be connected through one or more data transport means. For example, processor unit 110 and main memory 120 may be connected via a local microprocessor bus, and the storage 130, peripheral device(s) 180, and display system 170 may be connected via one or more input/output (I/O) buses.

Mass storage device 130, which may include mass storage implemented with a magnetic disk drive, an optical disk drive, FLASH memory, or be a portable USB data storage device. Mass storage device 130 can store the system software for implementing embodiments of the present invention for purposes of loading that software into main memory 120. The system software for implementing embodiments of the present invention may be stored on such a portable medium and input to the computer system 100 via the portable storage device.

Antenna 140 may include one or more antennas for communicating wirelessly with another device. Antenna 140 may be used, for example, to communicate wirelessly via Wi-Fi, Bluetooth, with a cellular network, or with other wireless protocols and systems. The one or more antennas may be controlled by a processor 110, which may include a controller, to transmit and receive wireless signals. For example, processor 110 executes programs stored in memory 120 to control antenna 140, transmit a wireless signal to a cellular network, and receive a wireless signal from the cellular network. Even though firewalls do not typically include an antenna and do not support receiving and transmitting wireless communications, a firewall consistent with the present invention could include wireless communications.

The system 100 as shown in FIG. 1 includes output devices 150 and input devices 160. Examples of suitable output devices include speakers, printers, and monitors. Input devices 160 may include a microphone, accelerometers, a camera, and other devices. Input devices 160 may also include an alpha-numeric keypad, such as a keyboard, for inputting alpha-numeric and other information, or a pointing device, such as a mouse, a trackball, stylus, or cursor direction keys. I/O devices 195 include network interfaces, and touch screens. Network interfaces used the present invention may be any computer network (wired or wireless) known in the art, including, yet are not limited to Ethernet, or 802.11.

Display system 170 may include a liquid crystal display (LCD), LED display, a plasma display, or be another suitable display device. Display system 170 receives textual and graphical information, and processes the information for output to the display device.

Peripherals 180 may include any type of computer support device to add additional functionality to the computer system. For example, peripheral device(s) 180 may include a modem or a router.

The components contained in the computer system 100 of FIG. 1 are those typically found in computing system, such as but not limited to a gateway, a firewall, a desktop computer, a laptop computer, a notebook computer, a netbook computer, a tablet computer, a smart phone, a personal data assistant (PDA), or other computer that may be suitable for use with embodiments of the present invention and are intended to represent a broad category of such computer components that are well known in the art. Thus, the computer system 100 of FIG. 1 can be a personal computer, hand held computing device, telephone, mobile computing device, workstation, server, minicomputer, mainframe computer, gateway, firewall, or any other computing device. The computer can also include different bus configurations, networked platforms, multi-processor platforms, etc. Various operating systems can be used including but not limited to Unix, Linux, Windows, Macintosh OS, Palm OS, Android OS, and Apple iOS.

Figure 2:
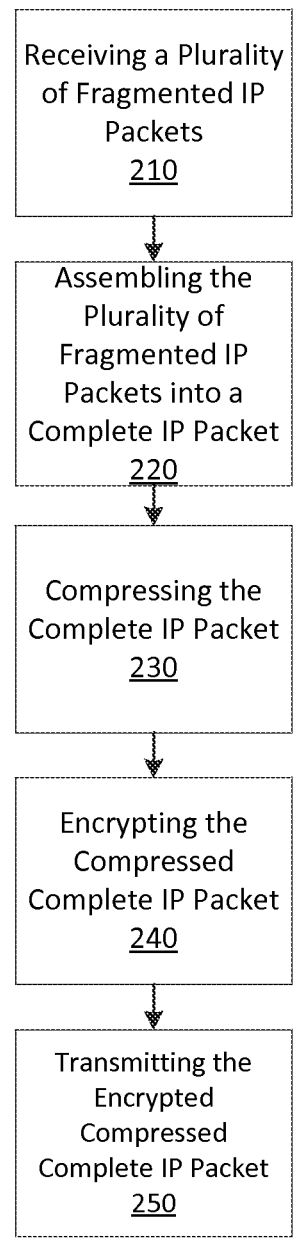
FIG. 2 illustrates a flow chart of a method for optimizing the flow of packetized data over a computer network.

FIG. 2 illustrates a flow chart of a method for optimizing the flow of packetized data over a computer network. FIG. 2 begins with step 210 where a plurality of fragmented packets are received by a gateway or other electronic device over a computer network interface. After receiving the plurality of fragmented packets, the IP packets or data from the plurality of IP packets may be reassembled into an IP packet (i.e., a coalesced IP packet) in step 220 of the flow chart. In certain instances the reassembled IP packet includes all data including overhead data from a datagram in the IP packet. The reassembled IP packet may include data from an entire message, or the reassembled IP packet may include data from a portion of a message or a portion of a data stream.

Data contained in one or more of the fields in the reassembled IP packet may be adjusted. For example, information in a header length filed, a header checksum field, a payload data filed, and in a total length field may be adjusted to reflect information included in the reassembled IP packet. Redundant overhead information, such as, a destination and a source address may optionally be removed from a data set when reassembling an IP packet. When overhead information is removed from a data set that is reassembled into an IP packet, the number of bytes included in the reassembled IP packet may be reduced as compared to an IP packet that includes redundant overhead information.

The present invention may optionally remove redundant overhead information when reassembling a data set from each of a plurality of fragmented IP packets. Data from the plurality of fragmented IP packets may be concatenated before being compressed. Redundant overhead information may include any information contained within a set of fragmented packets that may not be used by an application program at a destination computer including, yet not limited to a header length, a header checksum, a destination address, a source address, a data type, a length field, and a frame sequence number.

Next in step 230 the reassembled IP packet may then be compressed. When encryption is used the reassembled datagram may be encrypted in step 240 of the flow chart. In step 250 of the flow chart the reassembled IP packet may then be transmitted over a network communication interface to a destination computer.

The number of fragmented packets reassembled into a coalesced IP packet may be configured by an administrator of a computer network, or may be dynamically adjusted based on one or more characteristics identified in the plurality of fragmented IP packets. When the number of fragmented packets is configured by an administrator of a computer network, the administrator may enter information into a graphical user interface displayed on a display at a computing device accessed by the administrator.

For example, when the fragmented packets contain only tens of bytes of information a dozen fragmented packets may be coalesced into a reassembled IP packet. Alternatively when the fragmented packets include hundreds of bytes of information only five fragmented packets may be coalesced into a reassembled IP packet.

In a second example, data from a plurality of fragmented packets may be coalesced such that the reassembled IP packet includes all information that corresponds to a single complete message or command being transmitted from a source computer to a destination computer. In this instance after the reassembled IP packet has been compressed and encrypted it may be sent to the destination computer. When such a reassembled IP packet includes more bytes than identified by a maximum transmission unit (MTU) setting, the reassembled packet may be fragmented into two or more IP packets and then the fragmented IP packets may be sent to the destination computer.

In a third example, data from an audio or video data stream may be reassembled continuously into a series of individual coalesced IP packets before each coalesced IP packet is compressed and transmitted to a destination computer. Initially 10 fragmented packets from the data stream may be reassembled into an IP packet before being transmitted to a destination computer. The size of the reassembled compressed IP packet may then be used to adjust the number of packets coalesced into a next reassembled IP packet from the data stream. In the instance where data from the 10 fragmented packets after being coalesced and compressed includes a number of bytes that are less than half of a maximum transmission unit byte size, the present invention may coalesce the next 20 fragmented packets received into a second reassembled IP packet. After reassembling the second IP packet, the second IP packet may then be compressed and transmitted to a destination computer with confidence that the second reassembled IP packet should not exceed the MTU setting.

The number of fragmented packets reassembled into a coalesced IP packet may be dynamically adjusted according to an average amount of information in each fragmented packet, according to an average size of coalesced compressed and encrypted IP packets, or be adjusted according to settings set by an network administrator.

Figure 3:
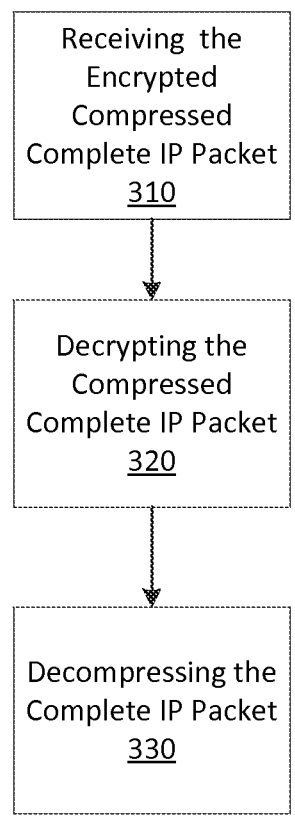
FIG. 3 illustrates a method where a computing device decrypts and decompresses an IP packet received over a network communication interface.

FIG. 3 illustrates a method where a computing device decrypts and decompresses an IP packet received over a network communication interface. In step 310 an IP packet that includes encrypted compressed data is received at the computing device. Next in step 320 data in the IP packet is decrypted and then in step 330 the data in the IP packet is decompressed. After the IP packet is decompressed payload data from the packet may be used by an application program at a destination computer.

The various methods may be performed by software operating in conjunction with hardware. For example, instructions executed by a processor, the instructions otherwise stored in a non-transitory computer readable medium such as memory. Various interfaces may be implemented—both communications and interface. One skilled in the art will appreciate the various requisite components of a mobile device and integration of the same with one or more of the foregoing figures and/or descriptions.

While various embodiments have been described above, it should be understood that they have been presented by way of example only, and not limitation. The description are not intended to limit the scope of the presently claimed invention or to limit the scope of embodiments of the present invention. The present descriptions are intended to cover alternatives, modifications, and equivalents consistent with the spirit and scope of the disclosure.

The invention claimed is:

1. A method for optimizing the transfer of packetized data between electronic devices in a computer network, the method comprising:
receiving data packets of a set comprising a plurality of fragmented internet protocol (IP) packets sent from a source computer to a destination computer for processing at the destination computer, the received set of fragmented IP packets comprising a number of bytes;
identifying that the set of fragmented IP packets includes redundant information;
assembling a first number of the set of fragmented IP packets into a coalesced IP packet, wherein assembling the set of fragmented IP packets comprises removing at least a portion of the redundant information to reduce the number of bytes, and
adjusting a header of the coalesced IP packet to include a length of the coalesced IP packet;
compressing the coalesced IP packet;
identifying a size of the compressed coalesced IP packet, the size of the compressed coalesced IP packet corresponding to a first average size;
identifying that the size of the compressed coalesced IP packet is less than a maximum transmission unit size;

transmitting the compressed coalesced IP packet to the destination computer;
identifying a second number of fragmented IP packets to coalesce into a second coalesced IP packet based on comparing the first average size to the maximum transmission unit size and increasing the number of the set of fragmented IP packets to include in the second coalesced IP packet to a second number of packets according to a calculation;
assembling the second number of the set of fragmented IP packets into a second coalesced IP packet;
compressing the second coalesced IP packet; and
transmitting the second compressed coalesced IP packet to the destination computer.

2. The method of claim 1, further comprising encrypting the compressed coalesced IP packet before transmitting the compressed coalesced IP packet.

3. The method of claim 1, wherein the plurality of fragmented IP packets are received over a first network interface at a computing device, and the compressed coalesced IP packet is transmitted over a second network interface at the computing device.

4. The method of claim 1, wherein the number of fragmented IP packets assembled into the coalesced IP packet corresponds to a predetermined setting.

5. The method of claim 4, wherein the predetermined setting is set by a network administrator at a graphical user interface (GUI) associated with the computing network.

6. The method of claim 1, wherein the number of fragmented IP packets assembled into the coalesced IP packet corresponds to historical information of one or more coalesced IP packets previously assembled in the computing network, and a number of fragmented IP packets previously assembled into each of the one or more coalesced IP packets include the same source and destination addresses.

7. The method of claim 6, wherein the historical information corresponds to at least one of an average amount of bytes in a set of coalesced IP packets previously assembled from the fragmented IP packets, and the fragmented IP packets are associated with at least one of an audio stream or a video stream.

8. A non-transitory computer-readable storage medium having embodied thereon a program executable by a processor to perform a method for optimizing the transfer of packetized data between electronic devices in a computer network, the method comprising:
receiving data packets of a set comprising a plurality of fragmented internet protocol (IP) packets sent from a source computer to a destination computer for processing at the destination computer, the received set of fragmented IP packets comprising a number of bytes;
identifying that the set of fragmented IP packets includes redundant information;
assembling a first number of the set of fragmented IP packets into a coalesced IP packet, wherein assembling the set of fragmented IP packets comprises removing at least a portion of the redundant information to reduce the number of bytes, and adjusting a header of the coalesced IP packet to include a length of the coalesced IP packet;
compressing the coalesced IP packet;
identifying a size of the compressed coalesced IP packet, the size of the compressed coalesced IP packet corresponding to a first average size;
identifying that the size of the compressed coalesced IP packet is less than a maximum transmission unit size;
transmitting the compressed coalesced IP packet to the destination computer;
identifying a second number of fragmented IP packets to coalesce into a second coalesced IP packet based on comparing the first average size to the maximum transmission unit size and increasing the number of the set of fragmented IP packets to include in the second coalesced IP packet to a second number of packets according to a calculation;
assembling the second number of the set of fragmented IP packets in to a second coalesced IP packet;
compressing the second coalesced IP packet; and
transmitting the second compressed coalesced IP packet to the destination computer.

9. The non-transitory computer-readable storage medium of claim 8, wherein the program further executable to encrypt the compressed coalesced IP packet before transmitting the compressed coalesced IP packet.

10. The non-transitory computer-readable storage medium of claim 8, wherein the plurality of fragmented IP packets are received over a first network interface at a computing device, and the compressed coalesced IP packet is transmitted over a second network interface at the computing device.

11. The non-transitory computer-readable storage medium of claim 8, wherein the number of fragmented IP packets assembled into the coalesced IP packet corresponds to a predetermined setting.

12. The non-transitory computer-readable storage medium of claim 11, wherein the predetermined setting is set by a network administrator at a graphical user interface (GUI) associated with the computing network.

13. The non-transitory computer-readable storage medium of claim 8, wherein the number of fragmented IP packets assembled into the coalesced IP packet corresponds to historical information of one or more coalesced IP packets previously assembled in the computing network, and a number of fragmented IP packets previously assembled into each of the one or more coalesced IP packets include the same source and destination addresses.

14. The non-transitory computer-readable storage medium of claim 13, wherein the historical information corresponds to at least one of an average amount of bytes in a set of compressed coalesced IP packets previously assembled from the fragmented IP packets, and the fragmented IP packets are associated with at least one of an audio stream or a video stream.

15. A system for optimizing the transfer of packetized data between electronic devices in a computer network, the system comprising:
one or more computer network interfaces that:
receive data packets of a set comprising a plurality of fragmented internet protocol (IP) packets sent from a source computer to a destination computer for processing at the destination computer;
a memory; and
a processor that executes instructions stored in the memory, wherein execution of the instructions:
identifies that the set of fragmented IP packets includes redundant information,
assembles a first number of the set of fragmented IP packets into a coalesced IP packet, wherein assembling the set of fragmented IP packets comprises removing at least a portion of the redundant information to reduce the number of bytes, and adjusting a header of the coalesced IP packet to include a length of the coalesced IP packet, and compresses the coalesced IP packet, identifies a size of the compressed coalesced IP packet, the size of the compressed coalesced IP packet corresponding to a first average size, identifies that the size of the compressed coalesced IP packet is less than a maximum transmission unit size, wherein one of the one or more computer network interfaces transmits the compressed coalesced IP packet to the destination computer, identifies a second number of fragmented IP packets to coalesce into a second coalesced IP packet based on comparing the first average size to the maximum transmission unit size and increasing the number of the set of fragmented IP packets to include in the second coalesced IP packet to a second number of packets according to a calculation, and assembles the second number of the set of fragmented IP packets into a second coalesced IP packet, and compresses the second coalesced IP packet, wherein the second compressed coalesced IP packet is transmitted to the destination computer.

16. The system of claim 15, wherein the processor further executes instructions out of the memory to encrypt the compressed coalesced IP packet before the compressed coalesced IP packet is transmitted.

17. The system of claim 15, wherein the number of fragmented IP packets assembled into the coalesced IP packet corresponds to a predetermined setting.

18. The system of claim 17, wherein the predetermined setting is set by a network administrator at a graphical user interface (GUI) associated with the computing network.

19. The system of claim 15, wherein the number of fragmented IP packets assembled into the coalesced IP packet corresponds to historical information of one or more coalesced IP packets previously assembled in the computing network, and a number of fragmented IP packets previously assembled into each of the one or more coalesced IP packets include the same source and destination addresses.

20. The system of claim 19, wherein the historical information corresponds to at least one of an average amount of bytes in a set compressed coalesced IP packets previously assembled from the fragmented IP packets, and the fragmented IP packets are associated with at least one of an audio stream or a video stream.

* * * * *